United States Patent
Han et al.

(10) Patent No.: US 12,013,772 B2
(45) Date of Patent: Jun. 18, 2024

(54) EXTENSIBILITY TO MONITOR MULTIPLE PRODUCTS

(71) Applicant: SAP SE, Walldorf (DE)

(72) Inventors: Sunyoung Han, Seoul (KR); Young Hun Kim, Bucheon (KR); Jongheon Park, Yongin-si (KR); Ye Fan, Xi'an (CN); Guanghui Qiu, Xi'an (CN); Hui Feng, Shanghai (CN); Chul Won Lee, Seoul (KR)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 17/554,755

(22) Filed: Dec. 17, 2021

(65) Prior Publication Data

US 2023/0195594 A1    Jun. 22, 2023

(51) Int. Cl.
  *G06F 11/34*  (2006.01)
  *G06F 9/48*  (2006.01)

(52) U.S. Cl.
  CPC .......... *G06F 11/3495* (2013.01); *G06F 9/485* (2013.01)

(58) Field of Classification Search
  CPC .. G06F 11/3495; G06F 9/485; G06F 11/3006; G06F 11/3055; G06F 11/34; G06F 11/34
  See application file for complete search history.

(56) References Cited

U.S. PATENT DOCUMENTS

| | | | | |
|---|---|---|---|---|
| 11,157,471 | B2* | 10/2021 | P | G06N 20/00 |
| 11,263,270 | B1* | 3/2022 | Goyal | G06F 16/256 |
| 2012/0066487 | A1* | 3/2012 | Brown | H04L 67/1027 709/224 |
| 2016/0006600 | A1* | 1/2016 | Gocek | G06F 16/2471 709/224 |
| 2017/0085449 | A1* | 3/2017 | Mota | H04L 67/12 |
| 2020/0097593 | A1* | 3/2020 | Chen | G06F 11/3442 |
| 2022/0260600 | A1* | 8/2022 | Nakatani | G01N 30/88 |

* cited by examiner

*Primary Examiner* — Maher N Algibhah
(74) *Attorney, Agent, or Firm* — Buckley, Maschoff & Talwalkar LLC

(57) ABSTRACT

Some embodiments include a system, method, and non-transitory medium, with the system including an interface to at least one database product; a stateless ping operator to manage lifecycle events associated with the at least one database product; and a first product-specific ping agent to determine an availability of and generate metrics associated with a plurality of instances of a first specific database product of the at least one database product monitored by the first product-specific ping agent, the first product-specific ping agent receiving an assignment of the plurality of instances of the first specific database product to monitor from the ping operator.

17 Claims, 8 Drawing Sheets

| No. | Product State | Load | Ping Result | Ping Result Reason | Service Stopped |
|---|---|---|---|---|---|
| 1 | STARTING | | FAILED | | FALSE |
| 2 | RUNNING | NORMAL | OK | | FALSE |
| 3 | | NORMAL | OK | | FALSE |
| 4 | | NORMAL | FAILED | NON-TIMEOUT ERROR. | FALSE |
| 5 | | NORMAL | FAILED | NON-TIMEOUT ERROR | FALSE |
| 6 | | HIGH LOAD | OK, BUT SOME T.O. FAILURES | TIMED OUT | FALSE |
| 7 | | HIGH LOAD | OK, BUT SOME T.O. FAILURES | TIMED OUT | FALSE |
| 8 | STOPPING | | FAILED | | TRUE |
| 9 | STOPPED | | FAILED | | TRUE |

*FIG. 7*

EXTENSIBILITY TO MONITOR MULTIPLE PRODUCTS

BACKGROUND

An enterprise may use a Database Management System ("DBMS") to handle a substantial number of database transactions. A number of different database products might be deployed to address the various needs of the enterprise, including or related to core database management services, management of cloud-based data storage services, analytics, and other products. In some aspects, it might be necessary, or at least helpful, to have an accurate understanding of the availability of the different deployed database products. As such, a monitoring service might be deployed to monitor and generate alerts in the event any of the different database products are not reachable. In some conventional systems, a monitoring agent might be generated and deployed for each instance of the different deployed database products.

There are disadvantages however to this typical approach. For example, the amount of resources devoted to the monitoring service might steadily increase as the number of instances of the different deployed database products increases. That is, the scalability of such monitoring services is limited. Additionally, some such monitoring systems might be limited to monitoring and providing alerts for a specific database product. That is, the monitoring and the alerting capabilities of these systems might depend on each other, thereby limiting the extensibility of such monitoring systems.

Accordingly, it would therefore be desirable to handle monitoring of a wide variety of database products in an efficient and accurate manner.

BRIEF DESCRIPTION OF THE DRAWINGS

FIG. 7 is a table listing example scenarios associated with a monitoring system, according to some embodiments.

Figure 1:
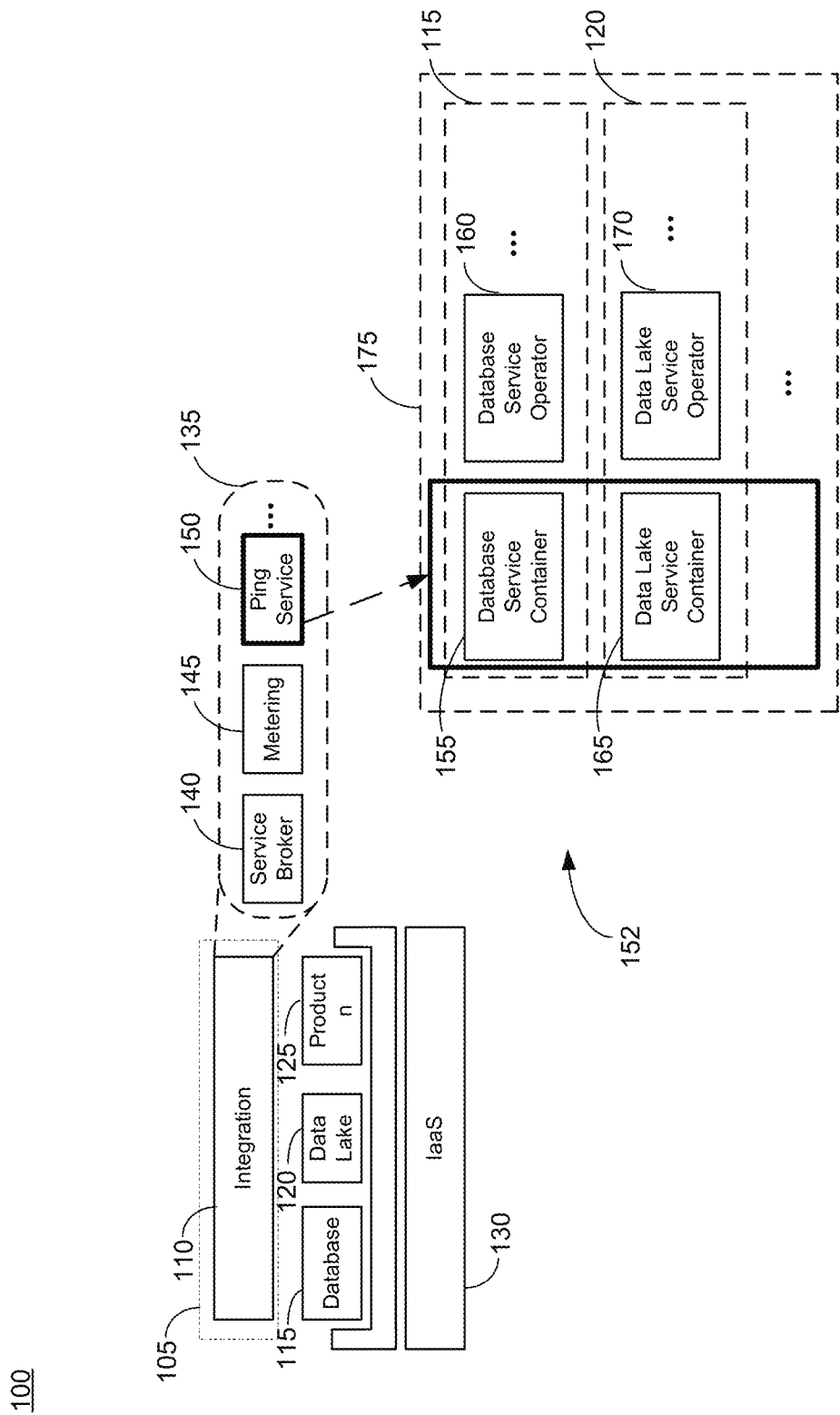
FIG. 1 is an illustrative example of a high level architecture cloud deployment including several database products and an associated monitoring system, according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Provided herein are system, method and/or computer program product embodiments, and/or combinations and sub-combinations thereof, to provide and extend monitoring of multiple database products in a cloud environment in a secure, automatic, and accurate manner. For example, FIG. 1 is an illustrative example of a high level cloud architecture 100 for a deployment of a DBMS (database management system) cloud including one or more database products or services according to some embodiments. In some aspects, architecture 100 might represent a DBMS cloud deployment landscape including an orchestration layer 105 (e.g., Kubernates, etc.) that includes an integration layer 110. Orchestration layer 105 might, in some embodiments, mainly be concerned with lifecycle control over one or more database products 115 (e.g., a database service), 120 (e.g., a cloud data lake service), and 125 (e.g., another database product) that are further supported infrastructure as a service (IaaS) 130. Database products 115, 120, and 125 may vary in number and function, and are representative of the multiple different database products that may be compatible with the present disclosure. Each database product may be deployed in a database product specific cluster. For example, database service 115 is provisioned and deployed in its own cluster, cloud data lake product or service 120 is deployed in a cloud data lake specific cluster, and so on. Each individual database product has their own cluster setup and orchestration layer 110 coordinates, for example, custom services events for the products. The events might include, for instance, creating instances of the specific products; deleting, stopping, starting, and updating the different services and properties thereof, etc. Requests for these (and other) types of events or actions might be received and implemented by orchestration layer 105.

FIG. 1 further details aspects of integration layer 110, as shown at 135. In some embodiments, integration layer 110 may include a number of infrastructure components. In the example of FIG. 1, the infrastructure components include a service broker 140 to, for example, manage the creating, deleting, stopping, starting, etc. of product instances; a metering component 145 to, for example, accurately monitor the use of the provided products and services; a ping service 150 to, for example, monitor and provide feedback regarding various aspects of the database products; and other infrastructure components (not shown in FIG. 1).

Further details of the cloud database products of the present example are depicted at 152. For example, database service 115 is represented as comprising a number of executable services or microservices including database service container 155 and database service operator 160 (though not shown in FIG. 1, other executable services or microservices might include, for example, a database service connectivity service, a database service backup service, an other database services or microservices). Data lake service 120 is shown as comprising a data lake service container 165 and data lake service operator 170, where additional and alternative services may also comprise data lake service 120.

Ping service 150 that, for example, may be responsible for monitoring aspects of the database products or services 115, 120, and 125, is illustrated as being provided by integration component 110 that interfaces with all of the different database products at 175, per some embodiments. In some aspects, ping service 150, which is a component of the orchestration layer of the architecture framework 100, might be configured to monitor multiple different database product types.

Figure 2:
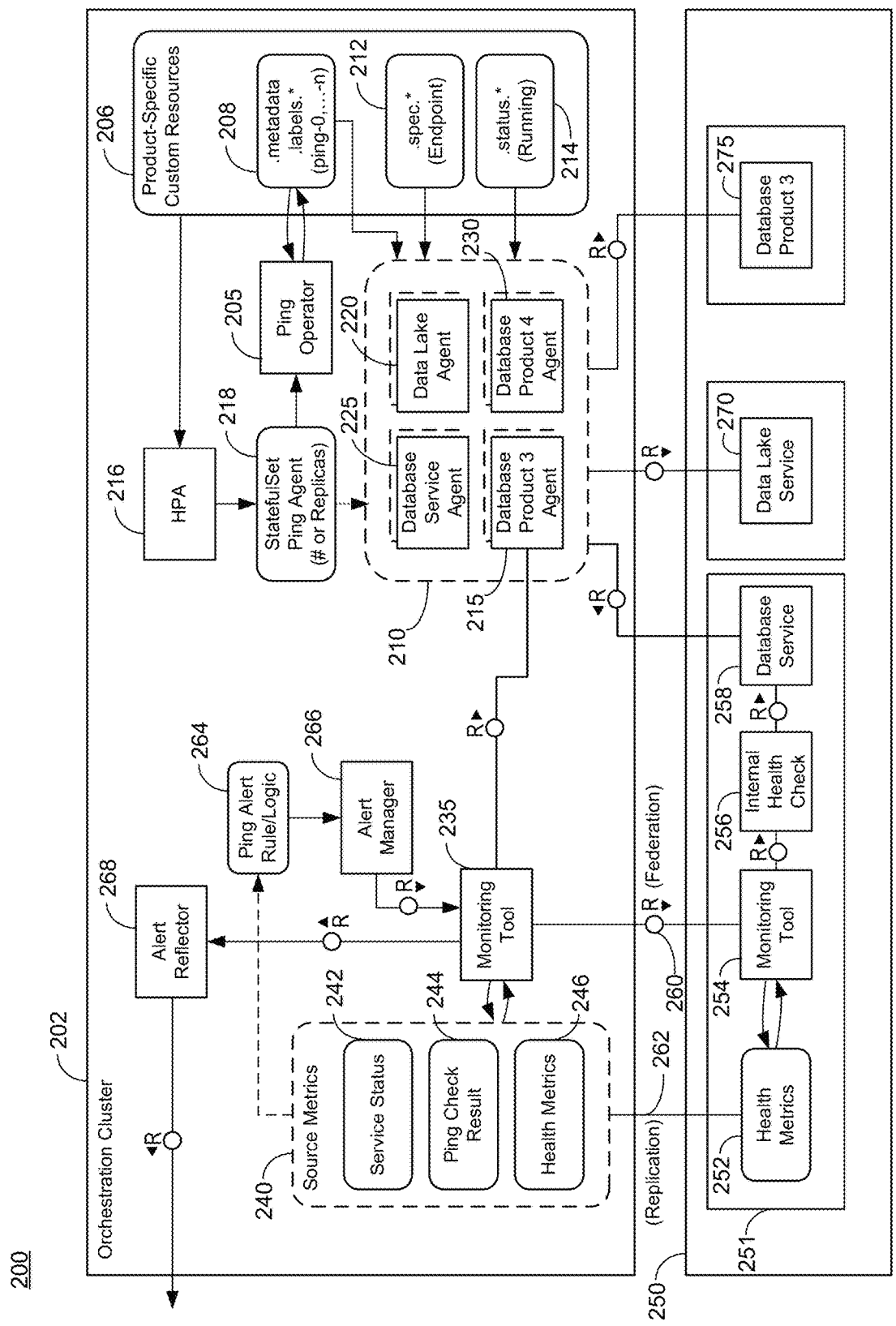
FIG. 2 is an illustrative diagram of a system architecture associated with a monitoring system, according to some embodiments.

FIG. 2 is an illustrative diagram of a system architecture 200 associated with a monitoring system, according to some embodiments. In some aspects, FIG. 2 includes an illustrative example of system components associated with some embodiments of a system architecture associated with a monitoring service (i.e., ping service) herein. In general, FIG. 2 includes an orchestration cluster 202 and multiple different database products 250, 270, and 270 each configured within a cluster that are monitored by a monitoring (i.e., ping) service within the orchestration cluster. In some embodiments, system architecture 200 and the database product clusters therein might be implemented, at least in part, by Kubernetes or other stateless containerized application frameworks Referring to FIG. 2, product-specific Custom Resources (CR) 206 are provided within the orchestration cluster 202. In some aspects, CR 206 are akin to extended metadata information that might be used to, for example, specify states, parameters, and other aspects of a database product service. Examples might include, a set of service instance information, including a service instance name or label 208, a service instance endpoint 212, and a service instance status 214. In some embodiments of a database product service herein, the CR might include metadata information 208, an endpoint or service instance name 212, a service status 214, and other database product service associated information such as, for example, a specification of a service instance (e.g., how many processors are allotted, how much memory is allocated for the service, etc.). In some embodiments, this or a similar type of metadata might be stored as CR for every database product service instance.

As illustrated in FIG. 2, a ping operator 205 is deployed, where the ping operator has the responsibility to, for example, manage lifecycle events associated with database service instances. The lifecycle events may be indicated by one or more of the information included in CR 206. Ping operator 205 may also create one or more ping agents collectively shown at 210. Ping agents 210 include database product-specific ping agents, including, for example, database service agent(s) 225, data lake agent(s) 220, database product 3 agent(s) 215, and database product 4 agent(s) 230 where each product-specific ping agent is independent of the other product-specific ping agents. Ping operator 205 may react to database service instance lifecycle events. For example, database service instance lifecycle events such as the generation of CR for a new database product service, the addition of a new instance for a particular database product, the deletion of an instance of a particular database product, etc. might trigger the ping operator to invoke one or more actions. As an example, ping operator 205 may assign newly added database service instances to a specific database service agent 225, remove newly deleted database service instance from being assigned to a specific database service agent 225, etc. In some embodiments, ping operator 205 assigns the monitoring target database instances (e.g., 258, 270, and 275) by labeling of metadata 208. The number of ping agents 210 may be controlled by HPA 216 by modifying the number of statefulset replica 218. As such, in some aspects the lifecycle of ping agents 210 may also be controlled by ping operator 205.

In some aspects, separation of the lifecycle event control provided via ping operator 205 from the ping agents 210 (i.e., the performance of the actual monitoring or ping check) provided by the framework or architecture of system 200 may be leveraged in some embodiments to monitor multiple different database products (e.g., database service 251, data lake service 270, database product 3 at 275, etc.). In some aspects, ping operator 205 mutually detects the service lifecycle events. In some embodiments, one or more of the different database products 251, 270, and 275 may have different specifications, communication protocols, etc. As such, the ping agent for each of the one or more of the different database products should be configured for each particular database products. Accordingly, some embodiments include a product-specific ping agent per database product, as shown in the example of FIG. 2.

In general, each of the product-specific ping agents may periodically reach out to (i.e., monitor) the instances (e.g., in database service cluster 251, etc.) of the database product service assigned thereto by ping operator 205, as specified by the CR endpoint 212 for each database product instance. As shown in FIG. 2, ping agents 210 are interfaced with multiple different database products 251, 270, and 275, where each product-specific agent communicates with its corresponding specific database product. For example, database service agent 225 communicates with instances of database service 258, data lake agent 225 communicates with instances of data lake service 270, database product 3 agent 215 communicates with instances of database product 3 at 275, database product 4 agent 230 communicates with instances of database product 4 (not shown in FIG. 2), etc.

The product-specific ping agents may further determine whether the particular database product instance assigned to and monitored by them is reachable or not. The product-specific ping agents may thus generate a set of metric information indicative of, for example, state information for the instances of the database product monitored by each product-specific ping agent 210. Some different states of instances of the database product monitored by each product-specific ping agent 210 might include, starting, running, stopping, stopped, reachable, unreachable, etc. Based on and in response to the information retrieved by the product-specific ping agents 210 regarding, for example, the reachability of the database product instances monitored thereby, an alerting mechanism may generate alarms, other statues indicators, and other outputs regarding the monitored database product instances. The metric information generated by the product-specific ping agents 210 may be obtained by or provided to a monitoring tool 235, that might function as, in some aspects, a metric store or metric collector. Monitoring tool 235 might operate to retrieve or otherwise obtain the ping metric information generated by each product-specific ping agent and store the retrieved metric information in, for example, a local time series database or other managed memory device. The status of a service (e.g., starting, started, running, stopping, stopped, deleting, deleted, etc.) may be derived from the ping agent generated metric information and stored as service status 242 and the ping check result regarding the reachability of the monitored database product instances may be derived from the ping agent generated metric information and stored as service status 244 within source metrics 240. Service status 242 and ping check result 244 might be used, at least in part, to generate ping alerts by an alert chain comprising, for example, ping alert rule(s)/logic 264, an alert manager 266 and an alert reflector 268. In some embodiments, one or more ping alert rule(s)/logic 264 may be applied or used by alert manager 266 to determine whether an alert or other reporting indicator should be generated. In some embodiments, the result of the determination of whether an alert should be generated (i.e., the alerts generated by alert manager 266) may be stored by the monitoring tool 235 and further sent to an alert reflector 268 that operates to transmit generated alerts to an alert receiving entity (e.g., an administrative manager, team, or system/device). In some aspects, the alert receiving entity may invoke one or more actions based on the alert(s) output by the alert chain of system 200.

In some embodiments, as illustrated in FIG. 2 for an example database product 251, the cluster comprising the database product may include a number of services or microservices for an instance of the database service 258. The services or microservices may include an internal health check service 256 that provides an indication of an internal reachability of the database service instance 258, a monitoring tool 254 that may collect or store the health metrics generated by the internal health check service 256 for each service instance. Monitoring tool 254 may send or otherwise communicate the health metrics to monitoring tool 235 such that the health metrics can be provided to source metrics 240 as part of a data federation 260 process and communicate the health metrics to health metrics data store 252 from which the health metrics may be replicated (as indicated at 262) to source metrics 240. In some embodiments, the health metrics might be used to reduce a total amount of false positive issues under, in particular, high load situations. Accordingly, in some embodiments a combination of three types of the metrics information including service status 242, ping check result 244, and health metrics 246 may be used as a basis to generate a ping alert.

In some aspects, the architecture of system 200 provides a framework that supports and enables the monitoring of multiple different database products in an efficient and extensible manner, based at least in part, on a separation of the functionalities of the ping operator and the ping agents. System 200 includes a separation of the ping operator lifecycle control area/aspects provided by ping operator 205 and the actual status and health check area/aspects provided by the product-specific ping agents. In some aspects, system 200 provides a certain level of decoupling between the ping agent implementation and the general alerting framework.

In some embodiments, system 200 supports and provides a mechanism of 1-to-N mapping approach for the ping agents 210, where one (1) ping agent may monitor and generate metrics for one or more (i.e., N) instances of a database product or service. In some aspects, the 1-to-N ping agent mapping approach supported and enabled by system 200 operates to reduce a total cost of ownership associated with a ping serviced, particularly as compared to a system that uses a 1-to-1 mapping approach where each ping agent may monitor and generate metrics for only one instance of a database product or service.

In some embodiments, such as a containerized deployment of applications and services (e.g., Kubernetes), autoscaling capabilities thereof (e.g., Kubernetes' horizontal pod autoscaler, HPA 216 in FIG. 2) might be leveraged to, for example, increase or decrease the number of ping agent instances to efficiently balance and process ping service workloads based on the actual resource consumption of an implemented system. For example, ping agent pods may be controlled by the exact, actual resource consumption. In this manner, if there is some resource consumption increases in some specific database product ping agent pods or a number of the pods, then HPA 216 may automatically increase the number of the ping agents 210, as specified in the stateful set 218, to distribute the workload amongst the determined number of ping agents.

In some aspects, each of the product-specific agents may provide certain predefined metrics. For example, the service status and the ping results might be generated by each of the different product-specific ping agents 215, 220, 225, and 230. In this manner, a common monitoring tool 235 might be used to, for example, periodically scrape (or otherwise obtain) the generated metrics information from the ping agents 210 and store it in a time series database for each database product. In some embodiments, the predefined metrics might conform to one or more specified formats.

Figure 3:
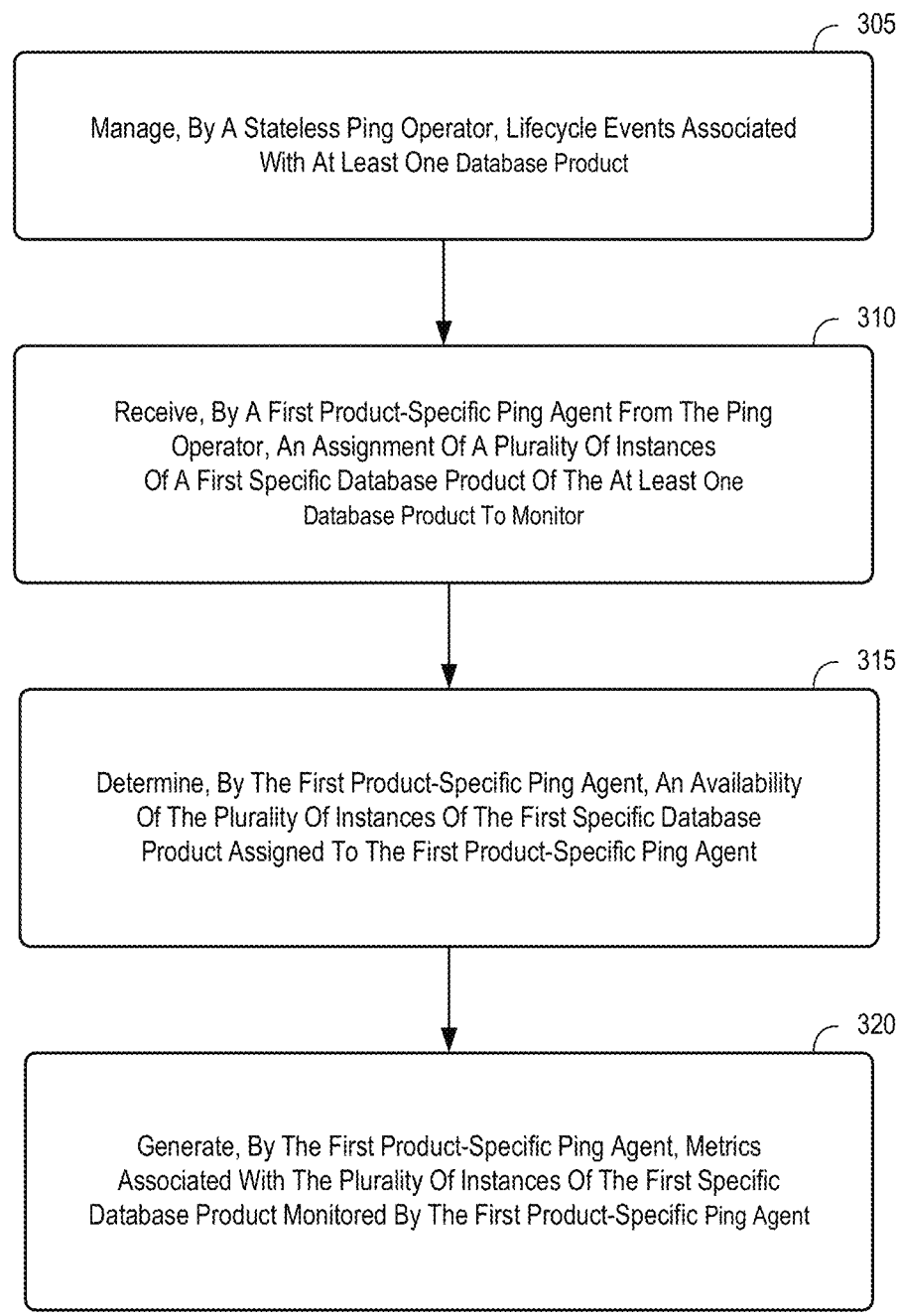
FIG. 3 is an illustrative flow diagram of a process, according to some embodiments.

FIG. 3 is a process 300 that might be performed by some or all of the elements of an embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

Operation 305 includes managing, by a stateless ping operator, lifecycle events associated with at least one database product. Referring to system 200 in FIG. 2, operation 305 may be implemented by ping operator 205 that detects lifecycle events based on CR information 206 regarding the instances of database specific products to manage, for example, the creation of a determined number of instances for the different product-specific ping agents 210.

Proceeding to operation 310, a first product-specific ping agent receives, from the ping operator, an assignment of a plurality of instances of a first specific database product of the at least one database product to monitor. Referring to the example of system 200 in FIG. 2, the first product-specific ping agent may be represented by database service agent 225 that receives an assignment of a plurality of instances of a database service (i.e., a first specific database product) to monitor from ping operator 205. Ping operator 205 may assign the plurality of instances of the database service to database service agent 225 based on, for example, labeling associated with instances of the database service as specified in metadata 208 of the CR information 206, where each instance of the database service is labeled to indicate the database product it is associated with and an identifier of the particular instance.

Continuing to operation 315 the first product-specific ping agent may function to determine an availability of the plurality of instances of the first specific database product of the at least one database product assigned for monitoring to the first product-specific ping agent. For example, the database service ping agent 225 in the example of FIG. 2 may determine an availability of the plurality of instances of the database service in cluster 251 assigned for monitoring by ping agent 225. That is, ping agent 225 may determine whether the plurality of instances of the database service in cluster 251 are available or reachable.

Continuing with process 300 to operation 320, the first product-specific ping agent may function to generate metrics associated with the plurality of instances of the first specific database product of the at least one database product monitored by the first product-specific ping agent. Referring again to the example of FIG. 2, ping agent 225 (i.e., an example of the first product-specific ping agent) may function to generate metrics (e.g., service status 242 and ping check result 244) associated with the plurality of instances 258 of the database service 251 monitored by ping agent 225.

In some aspects, systems (e.g., 100 and 200) and processes (e.g., 300) herein are not limited to including a specific number of different database products. That is, while some examples herein depict three (3) or four (4) different database products and each of the different database products have one or more corresponding product-specific agent(s), the number of different database products is not restricted to the number explicitly shown by the illustrative examples, unless otherwise stated. Likewise, whereas some examples herein depict different types of database products, the type of different database products is not restricted to the types explicitly shown by the illustrative examples, unless otherwise stated.

Figure 4:
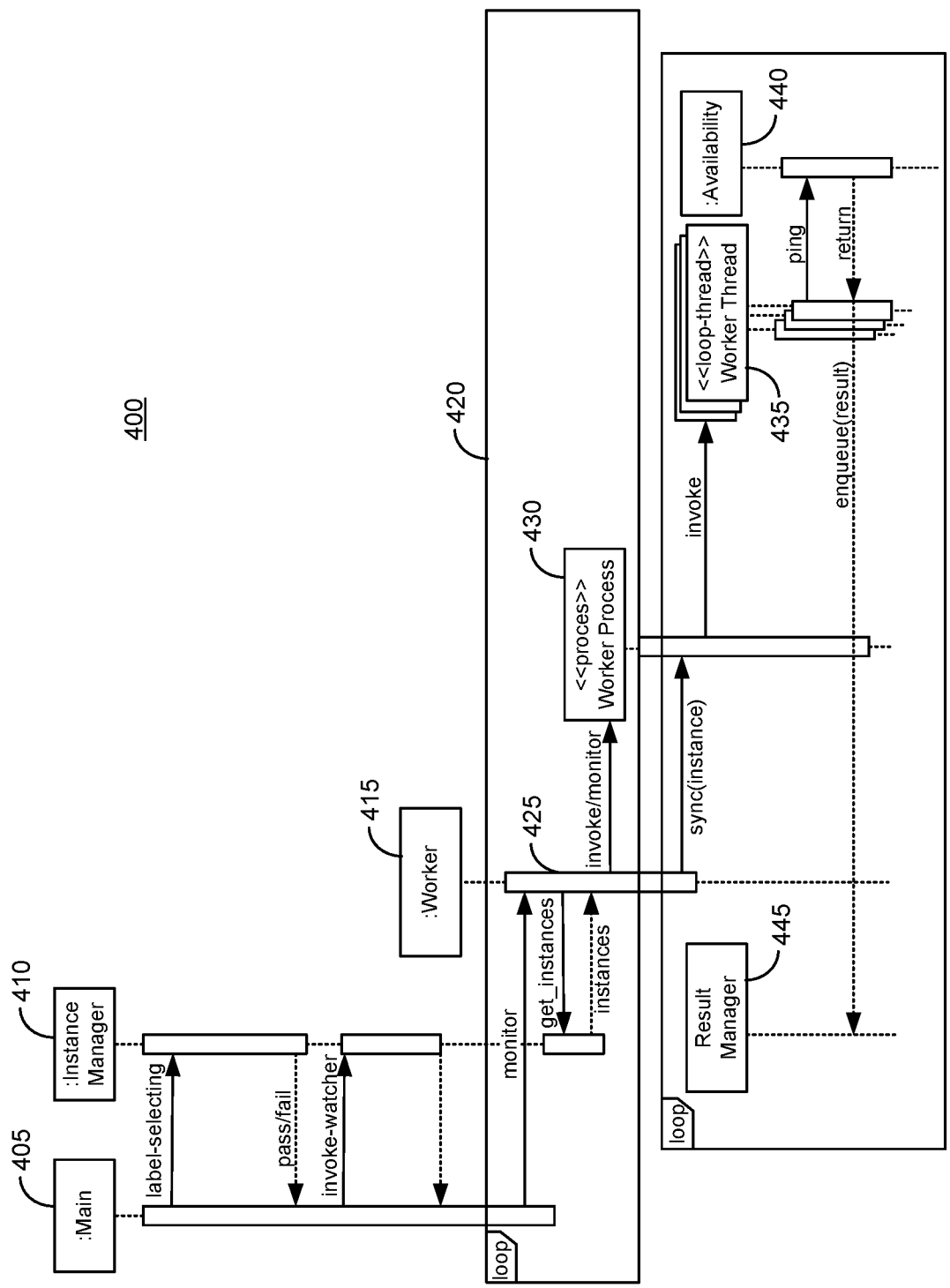
FIG. 4 is an illustrative diagram of a system architecture associated with a ping agent, according to some embodiments.

FIG. 4 is an illustrative diagram of a system architecture 400 associated with a ping agent, according to some embodiments. FIG. 4 further includes aspects of a representative process flow that might be processed by system architecture 400. For example, in an effort to reduce the total cost of operation amount or some other resource consumption for a ping agent (e.g., FIG. 2, database service ping agent 225), one single ping agent might monitor hundreds of instances of the corresponding database product (e.g., instances of database service 258 in cluster 251) in parallel. In an effort to support and provide an extent of scalability and complexity, system architecture 400 includes multi-process model in the single ping agent. System architecture 400 includes a loop area 420, where single worker processes 415 are created. A main program 405 is started, as well as an instance manager 410. Main process 405 is started for a ping agent (e.g., database service agent 225) and the instance manager 410 is created. Then, the worker thread 415 is executed, wherein worker thread 415 periodically checks a number of database product instances to be monitored based on the database service instances specified by instance manager 410.

In some embodiments, the ping operator determines a scheduling based on labeling from the CR information. The ping agent detects which instance(s) need to be monitored by it (e.g., database service ping agent 225 determines which database service instances it is to monitor). For example, there might be ten (10) ping agents and a corresponding ten (10) instance label values and the ping operator (e.g., ping operator 205 in FIG. 2) operates to assign the labels specified for the database service instances. The database service ping agent might operate to retrieve CR information based on the label filtering. Accordingly, a particular ping agent can retrieve the instances to be monitored thereby, as indicated at 425. Worker 415 may provide information regarding the instances to be monitored by the subject ping agent and further create multiple worker threads 430 internally. In this manner, a multi process, multithreaded approach may be provided, wherein worker process 430 is invoked and it provides information about the instances to be monitored and further distributes internal worker threads 435. Each worker thread 435 may perform the same type of ping check and retrieve/determine metric information 440 (i.e., availability or reachability) regarding the instance(s) it monitors. Result manager 445 manages and contains the information about the generated metrics. In some embodiments, a monitoring tool (e.g., FIG. 2, monitoring tool 235) may scrape or otherwise obtain the metrics information from the ping agents herein and store it in a time series data store associated with the monitoring tool. In some aspects, the architecture of system 200 provides a framework that supports and enables having a common metric name to expose the ping result by multiple product-specific agents, thereby providing extensibility.

Figure 5:
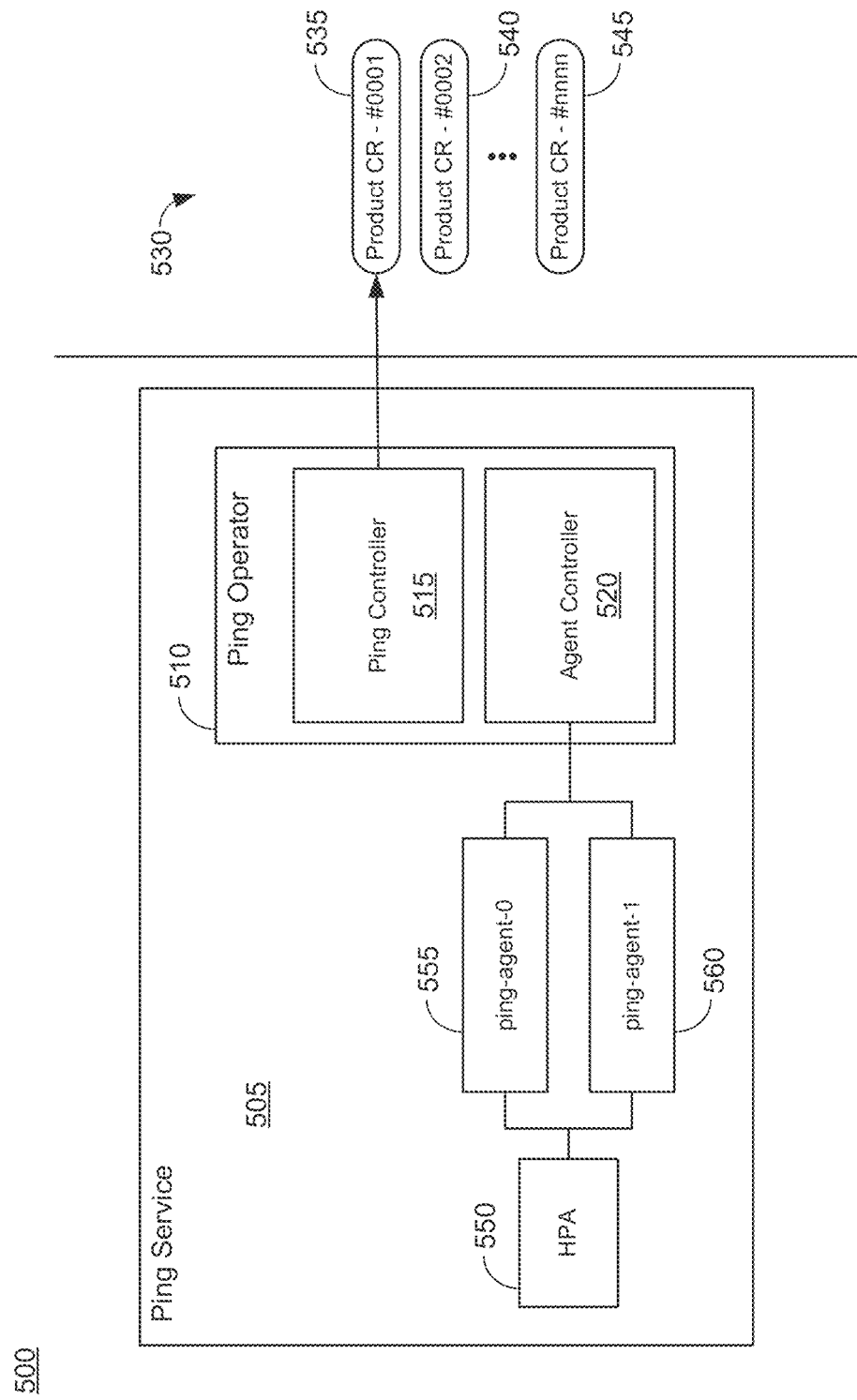
FIG. 5 is an illustrative diagram of a system architecture associated with a ping service, including details associated with a ping operator, according to some embodiments.

FIG. 5 is an illustrative diagram of a system architecture 500 associated with a ping service, including details associated with a ping operator, according to some embodiments. In the example of FIG. 5, ping service 505 is depicted as including a ping operator 510. In some aspects, ping operator 510 might perform at least some of the functions disclosed hereinabove as being performed by a ping operator. Ping operator 510 includes, in the example of FIG. 5, two main components including a ping controller 515 and an agent controller 520. Ping controller 515 may address events from CR objects (e.g., from a namespace hc-broker). In some embodiments, if a CR object is without a ping label, ping controller 515 may ascertain an appropriate agent and add a label to the CR object. Agent controller 520 may store an agent ID that can be added as a label to CR objects, and the number of instances that each ping agent might be monitoring. Examples of database product CR objects 535, 540, and 545, each including a label, are shown in namespace 530. In this manner, ping service 505 may be aware of a database product instance's existence and prepared to monitor it. In some embodiments, there is a mapping between the database product-specific CR and the product-specific agent artifact(s) (e.g., docker image) that might be used by agent controller 520 to recognize the indicators of product-specific agents. This aspect may be useful since, in some embodiments, the (optimal) number of product-specific ping agents might depend on the number of product instances that are provisioned in a production landscape.

Ping service 505 is shown as leveraging HPA 550 scaling capabilities of Kubernetes, in the example of FIG. 5. The ping agent, collectively represented by ping agent instances 555 and 560, scales the number of ping agent instances based on actual observed metrics like, for example, CPU utilization. In some embodiments, HPA 550 may periodically adjust the number of replicas of the ping agent to match the observed metrics to a specified target. In an instance when a new ping agent is scaled-out by HPA 550 in response to infrastructure metrics, the ping operator detects the change and assigns the agent for new instances. In some embodiments, a ping service herein might not utilize a scale-in feature of the HPA.

Figure 6:
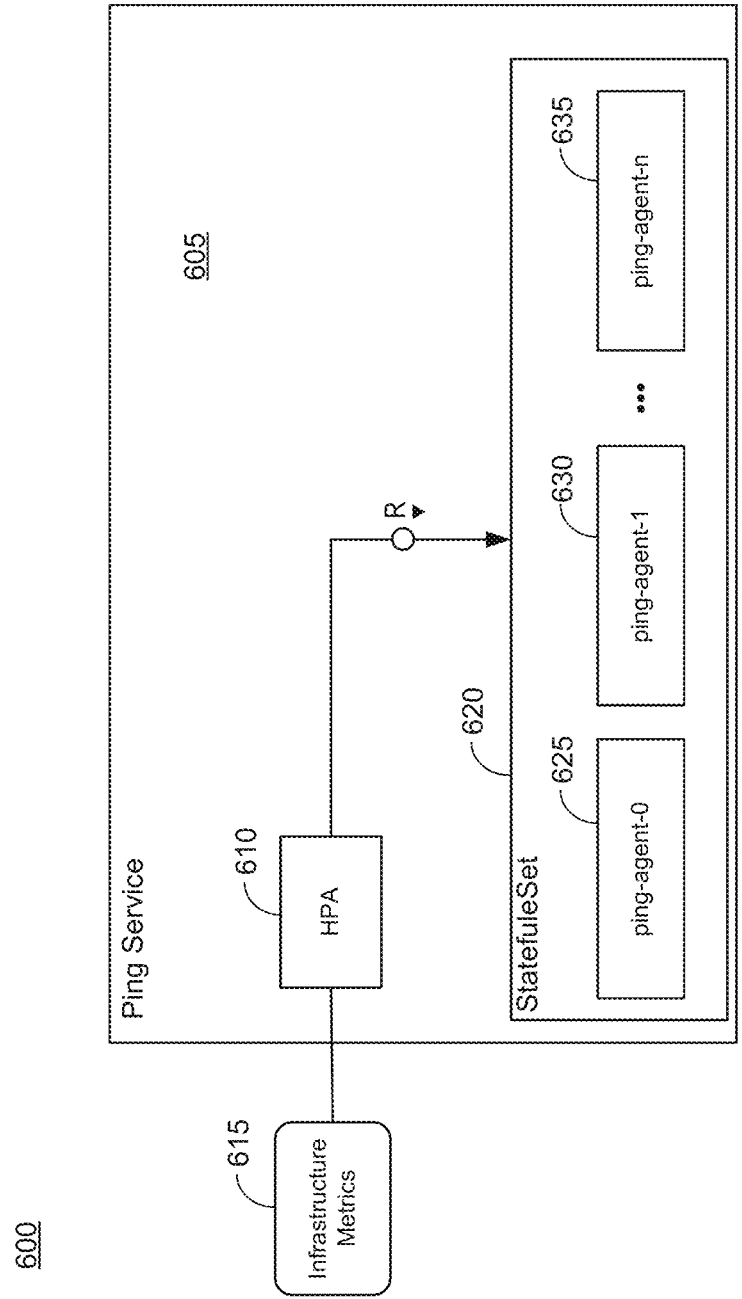
FIG. 6 is an illustrative diagram of a system architecture associated with a ping service, including aspects related to scalability, according to some embodiments.

FIG. 6 is an illustrative diagram of a system architecture 600 associated with a ping service 605, including aspects related to scalability, according to some embodiments. In some embodiments, a ping agent may be deployed as a pod of agents 625, 630, and 635 of a StatefulSet 620. Ping service 605 including HPA 610 may utilize the StatefulSet 620 to have stable, unique identifiers for labeling responsive to infrastructure metrics 615.

FIG. 7 is a table listing example scenarios associated with a monitoring system, according to some embodiments. In some embodiments, a ping service herein may generate alerts based on a combination of, for example, three types of the metrics information including service status, ping check result, and health metrics (e.g., FIG. 2, source metrics 240). Nine (9) scenarios including state values for a database product state, load situation, ping check result, and ping result reason are represented in the table of FIG. 7 that also lists whether or not the service is stopped based on the particular scenario. In general, it is noted that for: scenario (1) no alerts generated while starting up the instance; scenario (2) all checks are OK; scenario (3) the health metric should be checked since the endpoint is still reachable and an issue might be indicated; scenario (4) the ping service generates an alert since the connection to the endpoint is not possible; scenario (5) the ping service generates an alert since the connection to the endpoint is not possible; scenario (6) the ping service additionally checks the health metric, but will not raise an alert since the health metric indicates the instance is still reachable internally; scenario (7) the ping service additionally checks the health metric, but will not raise an alert since the health metric indicates the instance is still reachable internally; scenario (8) no alerts generated while stopping the instance; and for scenario (9) no alerts are generated when the instance is stopped.

FIG. 7 is illustrative of alert rules and logic that might be implemented, at least in part, by a ping service herein. Other, additional, and alternative alert rules and logic might be implemented, at least in part, by a ping service herein.

Figure 8:
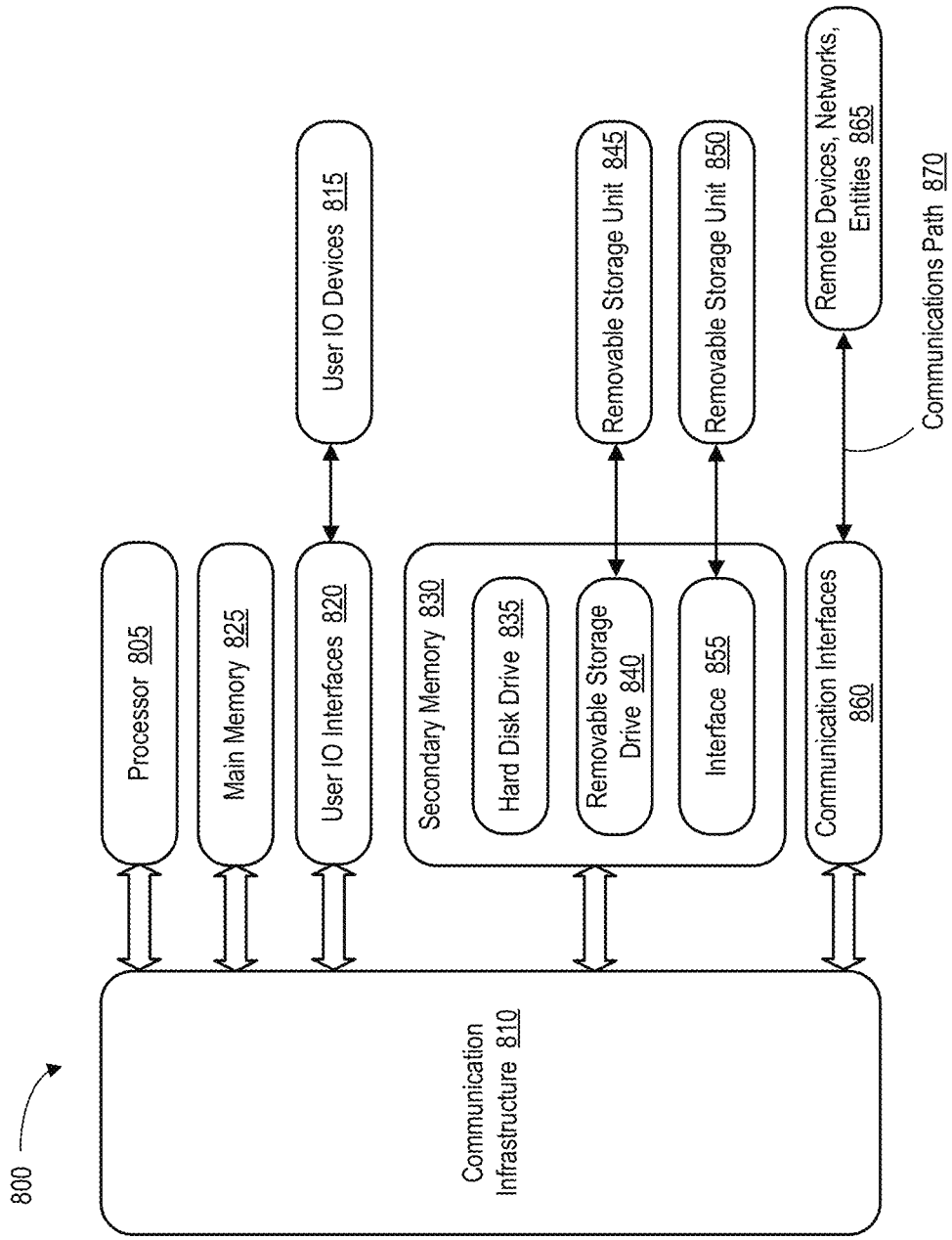
FIG. 8 is an example of a computer system useful for implementing various embodiments.

Various embodiments can be implemented, for example, using one or more well-known computer systems, such as computer system 800 shown in FIG. 8. The computer system 800 can be any well-known computer capable of performing the functions described herein. Computer system 800 includes one or more processors (also called CPUs), such as a processor 805. Processor 805 is connected to a communication infrastructure or bus 810.

One or more processors 805 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 815, such as monitors, keyboards, pointing devices, etc., that communicate with communication infrastructure xx06 through user input/output interface(s) 820.

Computer system 800 also includes a main or primary memory 825, such as Random-Access Memory ("RAM"). Main memory 825 may include one or more levels of cache. Main memory 825 has stored therein control logic (i.e., computer software) and/or data.

Computer system 800 may also include one or more secondary storage devices or memory 830. Secondary memory 830 may include, for example, a hard disk drive 835 and/or a removable storage device or drive 840. Removable storage drive 840 may be a floppy disk drive, a magnetic tape drive, a compact disk drive, an optical storage device, tape backup device, and/or any other storage device/drive.

Removable storage drive 840 may interact with a removable storage unit 845. Removable storage unit 845 includes a computer usable or readable storage device having stored thereon computer software (control logic) and/or data. Removable storage unit 845 may be a floppy disk, magnetic tape, compact disk, DVD, optical storage disk, and/any other computer data storage device. Removable storage drive 840 reads from and/or writes to removable storage unit 845 in a well-known manner.

According to an exemplary embodiment, secondary memory 830 may include other means, instrumentalities or other approaches for allowing computer programs and/or other instructions and/or data to be accessed by computer system 800. Such means, instrumentalities or other approaches may include, for example, a removable storage unit 850 and an interface 855. Examples of the removable storage unit 850 and the interface 855 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 860. Communication interface 860 enables computer system 800 to communicate and interact with any combination of remote devices, remote networks, remote entities, etc. (individually and collectively referenced by reference number 865). For example, communication interface 860 may allow computer system 800 to communicate with remote devices 865 over communications path 870, which may be wired and/or wireless, and which may include any combination of LANs, WANs, the Internet, etc. Control logic and/or data may be transmitted to and from computer system 800 via communication path 870.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 825, secondary memory 830, and removable storage units 845 and 850, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to monitor multiple database products, the system comprising:
a memory storing computer instructions; and
a processor communicatively coupled with the memory to execute the instructions to perform the operations of:
a stateless ping operator controller to manage lifecycle events associated with at least one database product of a database system, wherein the ping operator controller automatically monitors the at least one database product for new instances of the at least one database product and deprovisioning of instances of the at least one database product; and
a first product-specific ping agent of the database system to determine an availability of a plurality of instances of a first specific database product of the at least one database product monitored by the first product-specific ping agent and to generate metrics associated with the plurality of instances of the first specific database product of the at least one database product monitored by the first product-specific ping agent, the first product-specific ping agent receiving an assignment of the plurality of instances of the first specific database product to monitor from the ping operator and the ping operator managing the lifecycle events associated with the at least one database product of the database system independent of the first product-specific ping agent, wherein the ping operator controller assigns the plurality of instances of the first specific database product to the first product-specific ping agent based on the new instances and the deprovisioninq of instances of the at least one database product.

2. The system of claim 1, wherein the first product-specific ping agent sends metrics generated thereby to an alert generation system.

3. The system of claim 1, wherein the metrics generated by the first product-specific ping agent for the instances of the first specific database product monitored thereby include a ping check result regarding a reachability check of the plurality of instances of the first specific database product and an operating status regarding state information of the plurality of instances of the first specific database product.

4. The system of claim 1, further comprising an alert generation system that receives an internal health check metric from an internal health check service for the plurality of instances of the at least one database product monitored by the first product-specific ping agent.

5. The system of claim 4, wherein the alert generation system generates an alert based on the metrics generated by the first product-specific ping agent and the internal health check metric from the plurality of instances of the first specific database product monitored by the first product-specific ping agent.

6. The system of claim 1, wherein the metrics associated with the plurality of instances of the first specific database product and generated by the first product-specific ping agent conform to a common format for each of the at least one database products.

7. A computer-implemented method to monitor multiple database products, the method comprising:
managing, by a stateless ping operator controller, lifecycle events associated with at least one database product of a database system, including automatically monitoring the at least one database product for new instances of the at least one database product and deprovisioning of instances of the at least one database product;
receiving, by a first product-specific ping agent of the database system from the ping operator controller, an assignment of a plurality of instances of a first specific database product of the at least one database product to monitor, wherein the ping operator controller assigns the plurality of instances of the first specific database product to the first product-specific ping agent based on the new instances and the deprovisioninq of instances of the at least one database product;
determining, by the first product-specific ping agent, an availability of the plurality of instances of the first specific database product of the at least one database product assigned for monitoring to the first product-specific ping agent; and
generating, by the first product-specific ping agent, metrics associated with the plurality of instances of the first specific database product of the at least one database product monitored by the first product-specific ping agent, the ping operator managing the lifecycle events associated with the at least one database product of the database system independent of the first product-specific ping agent.

8. The method of claim 7, wherein the first product-specific ping agent sends the metrics it generates to an alert generation system.

9. The method of claim 7, wherein the metrics generated by the first product-specific ping agent for the instances of the first specific database product monitored thereby include a ping check result regarding a reachability check of the plurality of instances of the first specific database product and an operating status regarding state information of the plurality of instances of the first specific database product.

10. The method of claim 7, further comprising receiving an internal health check metric from an internal health check service for the plurality of instances of the first specific database product monitored by the first product-specific ping agent.

11. The method of claim 10, wherein the alert generation system generates an alert based on the metrics generated by the first product-specific ping agent and the internal health check metric from the internal health check service for the plurality of instances of the first specific database product monitored by the first product-specific ping agent.

12. The method of claim 7, wherein the metrics associated with the plurality of instances of the at least one database product and generated by the first product-specific ping agent conform to a common format for each of the at least one database products.

13. A non-transient, computer-readable medium storing instructions to be executed by a processor to perform a method to monitor multiple database products, the method comprising:
managing, by a stateless ping operator controller, lifecycle events associated with at least one database product of a database system, including automatically monitoring the at least one database product for new instances of the at least one database product and deprovisioning of instances of the at least one database product;
receiving, by a first product-specific ping agent of the database system from the ping operator controller, an assignment of a plurality of instances of a first specific database product of the at least one database product to monitor, wherein the ping operator controller assigns the plurality of instances of the first specific database product to the first product-specific ping agent based on the new instances and the deprovisioning of instances of the at least one database product;

determining, by the first product-specific ping agent, an availability of the plurality of instances of the first specific database product of the at least one database product assigned for monitoring to the first product-specific ping agent; and generating, by the first product-specific ping agent, metrics associated with the plurality of instances of the first specific database product of the at least one database product monitored by the first product-specific ping agent, the ping operator managing the lifecycle events associated with the at least one database product of the database system independent of the first product-specific ping agent.

14. The medium of claim 13, wherein the ping agent sends the metrics it generates to an alert generation system.

15. The medium of claim 13, wherein the metrics generated by the first product-specific ping agent for the instances of the first specific database product monitored thereby include a ping check result regarding a reachability check of the plurality of instances of the first specific database product and an operating status regarding a state information of the plurality of instances of the first specific database product.

16. The medium of claim 13, further comprising receiving an internal health check metric from an internal health check service for the plurality of instances of the first specific database product monitored by the first product-specific ping agent.

17. The medium of claim 16, wherein the alert generation system generates an alert based on the metrics generated by the first product-specific ping agent and the internal health check metric from the internal health check service for the plurality of instances of the first specific database product monitored by the first product-specific ping agent.

* * * * *